United States Patent
Owaki et al.

(10) Patent No.: US 8,363,512 B2
(45) Date of Patent: Jan. 29, 2013

(54) METHOD AND APPARATUS FOR ESTIMATING SOUND SOURCE

(75) Inventors: Masanao Owaki, Tokyo (JP); Takefumi Zaima, Tokyo (JP); Koji Mase, Tokyo (JP)

(73) Assignee: Honda Motors, Tokyo (JP)

(*) Notice: Subject to any disclaimer, the term of this patent is extended or adjusted under 35 U.S.C. 154(b) by 389 days.

(21) Appl. No.: 12/713,425

(22) Filed: Feb. 26, 2010

(65) Prior Publication Data
US 2010/0220552 A1    Sep. 2, 2010

(30) Foreign Application Priority Data

Feb. 27, 2009 (JP) .................................... 2009-46835
Mar. 2, 2009 (JP) .................................... 2009-48554

(51) Int. Cl.
*G01S 3/80* (2006.01)
(52) U.S. Cl. ........................................ 367/125; 367/124
(58) Field of Classification Search .................. 367/124, 367/125; 381/92
See application file for complete search history.

(56) References Cited

U.S. PATENT DOCUMENTS

| | | | | |
|---|---|---|---|---|
| 4,559,642 A | * | 12/1985 | Miyaji et al. | ................... 367/129 |
| 5,737,431 A | * | 4/1998 | Brandstein et al. | ............. 381/92 |
| 6,469,732 B1 | * | 10/2002 | Chang et al. | .................... 381/92 |
| 6,788,337 B1 | * | 9/2004 | Fujii | ........................ 348/207.99 |
| 2002/0181721 A1 | | 12/2002 | Sugiyama et al. | |

FOREIGN PATENT DOCUMENTS

| | | |
|---|---|---|
| JP | 8-160077 A | 6/1996 |
| JP | 2002-181913 A | 6/2002 |
| JP | 2004-77277 A | 3/2004 |
| JP | 2005-348860 A | 12/2005 |
| JP | 2006-324895 A | 11/2006 |
| JP | 2007-256283 A | 10/2007 |
| JP | 2008-224259 A | 9/2008 |

* cited by examiner

*Primary Examiner* — Ian Lobo
(74) *Attorney, Agent, or Firm* — Birch, Stewart, Kolasch & Birch, LLP (57) ABSTRACT

Sound and image are sampled simultaneously using a sound/image sampling unit incorporating a plurality of microphones and a camera. Sound pressure waveform data and image data are stored in a storage means. Then the sound pressure waveform data are extracted from the storage means, and a graph of a time-series waveform of the sound pressure level is displayed on a display screen. A time point at which to carry out a calculation to estimate sound direction is designated on the graph, and then sound direction is estimated by calculating the phase differences between the sound pressure signals of the sound sampled by the microphones, using the sound pressure waveform data for a calculation time length having the time point at the center thereof. A sound source position estimation image having a graphic indicating an estimated sound direction is created and displayed by combining the estimated sound direction and the image data sampled at the time point.

11 Claims, 7 Drawing Sheets

METHOD AND APPARATUS FOR ESTIMATING SOUND SOURCE

FIELD OF THE INVENTION

The present invention relates to a method and an apparatus for estimating a sound source using sound information sampled by a plurality of microphones and image information sampled by an image pickup means.

BACKGROUND OF THE INVENTION

There is an acoustic technique among conventional methods for estimating the direction-of-arrival (DOA) of a sound (or sounds). In this technique, an array of microphones is set up at equally-spaced intervals, and the direction of a sound source, or the direction-of-arrival of a sound wave, is estimated from the phase differences of microphones with respect to a reference microphone. An example of such a technique is disclosed in the book entitled "Acoustic System and Digital Processing" by Juro Ohga, Yoshio Yamazaki, and Noboru Kaneda, Corona Publishing Co., 1995, the disclosure being hereby incorporated herein by reference.

There is, on the other hand, another method for estimating the direction of a sound source (hereinafter also referred to as "sound direction") which does not use the phase differences of output signals of a plurality of microphones located at a measuring point. In this method, sound direction is estimated by arranging a plurality of microphone pairs on straight lines which bisect each other at right angles and finding a ratio between the arrival time difference (corresponding to the phase difference) between the two microphones of a pair and that of the other pair. Such a method is disclosed, for instance, in Japanese Unexamined Patent Application Publication No. 2002-181913, Japanese Unexamined Patent Application Publication No. 2006-324895, and Japanese Unexamined Patent Application Publication No. 2008-224259.

Figure 10:
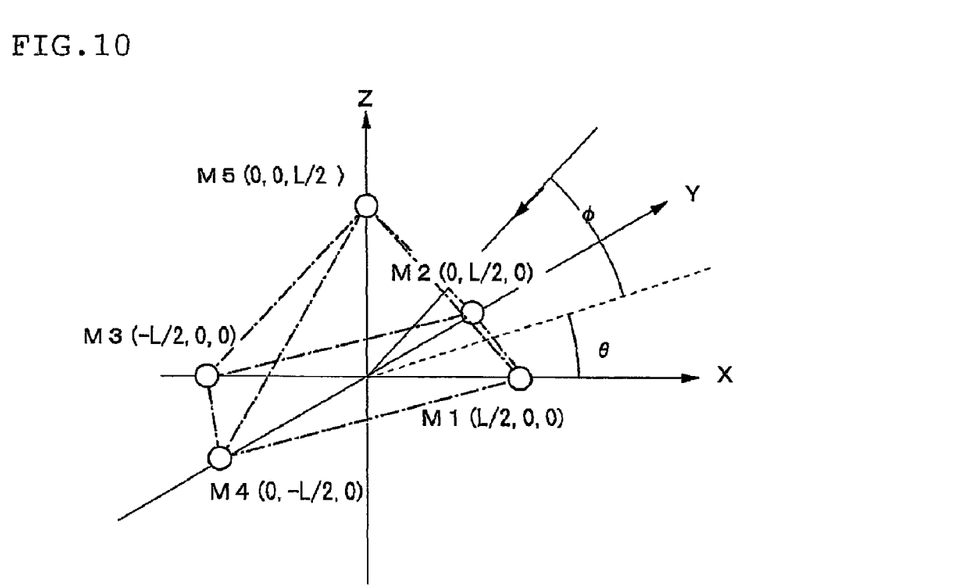
FIG. 10 illustrates an arrangement of microphones in a conventional sound source detection method using microphone pairs.

Specifically, as shown in FIG. 10, four microphones M1 to M4 are arranged in two microphone pairs, namely, a microphone pair (M1, M3) in range with each other at a predetermined interval and a microphone pair (M2, M4) in range with each other at the same predetermined interval, on two straight lines bisecting at right angles, and a horizontal angle θ formed between the measuring point and a sound source position is estimated from the ratio between the arrival time difference between the sound pressure signals entering the microphones M1 and M3 constituting the microphone pair (M1, M3) and that between the sound pressure signals entering the microphones M2 and M4 constituting the microphone pair (M2, M4). In addition, a fifth microphone M5 is placed in a position perpendicularly apart from the plane formed by the microphones M1 to M4 such that it further forms four microphone pairs (M5, M1), (M5, M2), (M5, M3), and (M5, M4), and an elevation angle φ between the measuring point and the sound source position is estimated from the arrival time differences between the microphones constituting the respective microphone pairs.

This arrangement enables estimation of sound direction with accuracy by fewer microphones than in the microphone array technique first mentioned herein.

Also, an image sampling means, such as a CCD camera, can be added to this arrangement. After an image in the estimated direction of a sound source is captured, the image data and the sound direction data may be combined with each other for a graphic representation of the estimated sound direction and the sound pressure level shown within the image. Such a graphic representation will help the user visually grasp the sound sources.

Also, in an actually practiced method, images are continuously picked up by the image sampling means simultaneously with the sampling of sounds, and the image information, together with the sound information, is stored in the computer as moving images. Then the estimation of a sound source is performed by calculating the sound direction and graphically displaying the sound direction and the sound pressure level in the images.

In the conventional method, however, after the sound information and the image information are loaded into the computer, all the information thus loaded is used in the calculation of the direction of the sound source. As a result, the analysis of the sound source position takes a considerable time, and it is not possible to see the result of the sound source estimation instantly on the spot. Also, another drawback of the method is its inability to verify the validity of the measurement taken.

The present invention has been made to overcome such drawbacks of the conventional method, and an object thereof is to provide a method and an apparatus for estimating a sound source position on the spot by extracting an optional portion of measured data.

SUMMARY OF THE INVENTION

An aspect of the present invention provides a method for estimating a sound source, comprising the steps of (a) sampling sound information and image information simultaneously using a sound/image sampling unit incorporating a plurality of microphones and an image pickup means, (b) storing sound pressure waveform data which is sound pressure signals of the sampled sound and image data which is the sampled image information respectively in a storage means, (c) extracting only the sound pressure waveform data from the storage means and displaying a graph of a time-series waveform of sound pressure level, (d) designating a temporal position on the graph at which to perform calculation to estimate the direction of a sound source, (e) estimating the direction of a sound source by calculating the phase differences between the sound pressure signals of the sound sampled by the plurality of microphones, using sound pressure waveform data for a predetermined calculation time length having the designated temporal position therein, (f) creating a sound source position estimation image having a graphic showing the estimated direction of a sound source by combining the estimated direction of a sound source with the image data sampled during the calculation time; and (g) estimating a sound source using the sound source position estimation image.

Another aspect of the present invention provides the method for estimating a sound source, wherein in step (b), the sound pressure signals of the sampled sound are A/D converted and stored as sound pressure waveform data in the storage means, and the image signals are A/D converted and stored as image data in the storage means, in step (c), a graph of a time-series waveform of sound pressure level is displayed on a display screen of a display means, in step (d), the temporal position at which to perform calculation to estimate the direction of a sound source is designated by specifying a specific point on the graph on the display screen, in step (e), the sound pressure waveform data for a predetermined calculation time length having the designated temporal position therein are extracted from the storage means, and step (f) further comprises the steps of extracting the image data at a point of time between the starting time and the ending time of the calculation time from the storage means, and creating and displaying a sound source position estimation image by combining the sound direction data estimated in step (e) with the extracted image data.

Still another aspect of the present invention provides the method for estimating a sound source, wherein in step (c), the time-series waveform of sound pressure level to be extracted from the storage means is a time-series waveform of the loudness of sampled sound.

Another aspect of the present invention provides the method for estimating a sound source, wherein step (c) further comprises the steps of, designating a frequency band of sound pressure signals (to be used in sound source estimation), obtaining a time-series waveform of sound pressure level in the designated frequency band by performing a frequency analysis on the time-series waveform of sound pressure level extracted from the storage means and displaying a graph of the obtained time-series waveform of sound pressure level in the designated frequency band on the display screen of the display means.

Yet another aspect of the present invention provides the method for estimating a sound source, further comprising the steps of, (h) storing the sound pressure waveform data on the sound pressure signals of the sampled sound and the image data on the sampled image respectively in a temporary storage means, (i) extracting sound pressure waveform data and image data stored in the temporary storage means during a period from a time point a predetermined retroactive time length before the issue of a command to start a measurement to a time point a predetermined analysis time length thereafter when such a command is issued, (j) storing those data as a sound file and a moving image file respectively in the storage means, (k) estimating the direction of a sound source by calculating the phase differences between the sound pressure signals of the sound sampled by the plurality of microphones, using the sound pressure waveform data of the stored sound file and (l) creating a sound source position estimation image having a graphic showing the estimated direction of a sound source by combining the estimated direction of a sound source with the image data sampled during the time used in estimating the direction of a sound source and stored in the moving image file.

Another aspect of the present invention provides a method for estimating a sound source according, wherein in step (j), sound pressure waveform data and image data for an analysis time length to be used in estimating a sound source are extracted from the temporary storage means, and the extracted sound pressure waveform data and image data are stored as a sound file and a moving image file respectively in the storage means; in step (k), sound pressure waveform data for a calculation time length to be used in the calculation to estimate the direction of a sound source is extracted from the sound file, and the direction of a sound source is estimated by calculating the phase differences of the sound pressure signals of the sound sampled by the plurality of microphones, and in step (j), the sound pressure waveform data and image data for the analysis time length extracted from the temporary storage means are the sum of the sound pressure waveform data and image data stored in the temporary storage means during a period from a second time point, which is a predetermined retroactive time length before a first time point, when a command to start the measurement is issued, to the first time point and the sound pressure waveform data and image data stored in the temporary storage means during a period from the first time point to a third time point, which is the analysis time length minus the retroactive time length past the first time point.

Still another aspect of the present invention provides The method for estimating a sound source according to claim 6, wherein between step (j) and step (k) there are further steps of:

(m) creating a graph of a time-series waveform of sound pressure waveform from the data on sound pressure waveform stored in the sound file and displaying it and (n) designating an optional time point on the displayed graph, wherein, in step (k), the sound pressure waveform data for the calculation time length from the designated time point are extracted from the sound file.

Yet another aspect of the present invention provides an apparatus for estimating a sound source comprising, a sound/image sampling unit which includes a group of microphones in two pairs of microphones, the microphones arranged at a predetermined interval on two straight lines bisecting at right angles, for sampling a sound from a sound source and an image pickup means for sampling images in the direction of the sound source simultaneously with sampling the sound and a sound source position estimating unit which includes an A/D converter for A/D converting sound pressure signals sampled by the microphones and image signals sampled by the image pickup means into their respective digital signals, a storage means for storing sound pressure waveform data arranged in a time series of the A/D converted sound pressure signals as a sound file and moving image data arranged in a time series of the A/D converted image signals as a moving image file, a sound pressure waveform creation means for extracting sound pressure waveform data for a predetermined calculation time length from the sound file and creating a graph of a time-series waveform of sound pressure level, a calculation position designating means for designating a temporal position at which to perform calculation to estimate sound direction by designating a specific point on the graph of the time-series waveform, a sound source direction estimating means for extracting sound pressure waveform data for the predetermined calculation time length including the designated temporal position therein, obtaining phase differences between the respective microphones constituting the two microphone pairs by performing a frequency analysis on the extracted sound pressure waveform data, and estimating the direction of a sound source from the ratio between the obtained phase differences of the two microphone pairs, an image data extracting means for extracting image data at a time point between the starting time and the ending time of the calculation time from the moving image file, a sound source position estimation image creation, means for creating a sound source position estimation image having a graphic showing the estimated direction of a sound source by combining the data on the estimated direction of a sound source with the extracted image data and a display means for displaying a graph of a sound pressure waveform created by the sound pressure waveform creation means and the sound source position estimation image created by the sound source position estimation image creation means.

Another aspect of the present invention provides the apparatus for estimating a sound source, wherein the sound source position estimating unit further includes a temporary storage means for temporarily storing the A/D converted sound pressure signals as sound pressure waveform data and the A/D converted image signals as image data for a predetermined period of time, a command signal output means for outputting a command signal to start the estimation of a sound source direction and an analysis file creation means for creating a sound file and a moving image file by extracting sound pressure waveform data and image data for a predetermined analysis time length from the temporary storage means, wherein the analysis file creation means creates the sound file and the moving image file by extracting the sound pressure waveform data and image data stored in the temporary storage means during a period from a second time point, which is a predetermined retroactive time length before a first time point, when a command to start the measurement is issued, to the first time point and the sound pressure waveform data and image data stored in the temporary storage means during a period from the first time point to a third time point, which is the analysis time length minus the retroactive time length past the first time point, when the command signal is inputted and wherein the storage means stores the sound file and the moving image file created by the analysis file creation means.

Still another aspect of the present invention provides the apparatus for estimating a sound, wherein a fifth microphone is added in a position perpendicularly apart from the plane formed by the two microphone pairs of the group of microphones and wherein the sound source direction estimating means estimates the direction of a sound source, using phase differences between the microphones constituting four sets microphone pairs which are formed by the fifth microphone and the two pairs of microphones.

According to the present invention, therefore, sound and image are sampled simultaneously using a sound/image sampling unit incorporating a plurality of microphones and an image pickup means. Then the sound pressure waveform data and image data are stored respectively in a storage means. Then only the sound pressure waveform data are called up from the storage means. Now a graph of a time-series waveform of the sound pressure level is displayed and a temporal position at which to carry out a calculation to estimate sound direction is designated on the graph. Then sound direction is estimated using the sound pressure waveform data for a predetermined calculation time length having the designated temporal position therein. Therefore, a sound source position can be estimated on the spot by extracting an optional part of measured data. This greatly shortens the time for estimating a sound source position.

Also, in estimating the sound source, the estimated sound direction and the image data sampled during the calculation time are combined with each other to create a sound source position estimation image having graphics showing estimated sound directions. The use of the sound source position estimation image realizes highly reliable sound source estimation.

Also, when there is some doubt about the validity of measurement taken, for example, due to an inappropriate position of the measuring point, this method facilitates a quick decision for remedy, thus enabling efficient estimation of the sound source position. Moreover, the capability of extracting data for an optional time period permits grasp of changes in sound source position and verification on the spot of the history of the propagated sounds.

Also, if a sound source is estimated along the steps of claim 2, then the sound source position can be estimated reliably by extracting an optional part of measured data on the spot.

And if the displayed time-series waveform of sound pressure level is so arranged to represent the loudness of the sampled sound, the sound source position can be estimated in answer to the loudness of the propagated sound.

Also, if the displayed time-series waveform of sound pressure level is so arranged to represent a time-series waveform of sound pressure level in a predetermined frequency band, then it is possible to estimate sound source positions of sounds propagated from specific equipment, such as the noise from a transformer in a power supply box or the vibration noise of an air conditioner.

Further, according to the present invention, sound and image are sampled simultaneously using a sound/image sampling unit incorporating a plurality of microphones and an image pickup means. Then the sound pressure waveform data and image data are stored respectively in a temporary storage means. And when a command to start a sound direction measurement is issued, the sound pressure waveform data and image data stored in the temporary storage means during a period from a time point a predetermined retroactive time length before the time point of the command issue to a time point a predetermined analysis time length later are extracted and stored as a sound file and a moving image file in the storage means. Then, using the sound pressure waveform data of the stored sound file, the sound direction is estimated by calculating the phase differences between the sound pressure signals sampled by the plurality of microphones. Therefore even when sudden sounds or intermittent sounds occur, the directions of sources of such sounds can be estimated with high reliability. Accordingly, there will be fewer chances of failed measurement and reduced amount of useless measured data, thus realizing a highly efficient estimation of sound source positions.

Also, in estimating the sound source, the estimated sound direction and the image data sampled during the calculation time for estimating the sound direction are combined with each other to create a sound source position estimation image having graphics showing estimated sound directions. The use of this sound source position estimation image realizes highly reliable sound source estimation.

Also, if a sound source is estimated along the steps of claim 6, then the sources of sudden sounds or intermittent sounds can be estimated reliably.

And if the displayed time-series waveform of sound pressure level is so arranged to represent the loudness of the sampled sound, the sound source position can be estimated in answer to the loudness of the propagated sound.

Also, the creation and display of a graph of a time-series waveform of sound pressure wave from the sound pressure waveform data stored in the sound file and the extraction of sound pressure waveform data for a calculation time length from an optional time point designated on the graph from the sound file make it possible to efficiently and effectively use the sound pressure waveform data stored in the sound file, thus realizing an efficient estimation of a sound source position.

Also, use of a sound source estimating system as recited in claim 8 allows a reliable extraction of an optional part of measured data, thus realizing an efficient estimation of a sound source position.

Also, use of a sound source estimating system as recited in claim 9 allows a reliable estimation of the sources of sudden sounds or intermittent sounds.

And if a sound sampling means is structured, which includes the first to fourth microphones in two microphone pairs arranged at a predetermined interval on two straight lines bisecting at right angles and a fifth microphone located apart from the plane formed by the two pairs of microphones and if the sound direction is estimated using the ratio of phase differences between the microphones constituting the two microphone pairs and the phase differences the first to fifth microphones, then the horizontal angle θ and the elevation angle φ can be estimated efficiently and accurately with a smaller number of microphones.

It is to be noted that any arbitrary combination or rearrangement of the above-described structural components and so forth are all effective as and encompassed by the present embodiments. Moreover, this summary of the invention does not necessarily describe all necessary features so that the invention may also be sub-combination of these described features.

This invention may be more clearly understood from the following detailed description and by reference to the drawings, in which.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

First Embodiment

Figure 1:
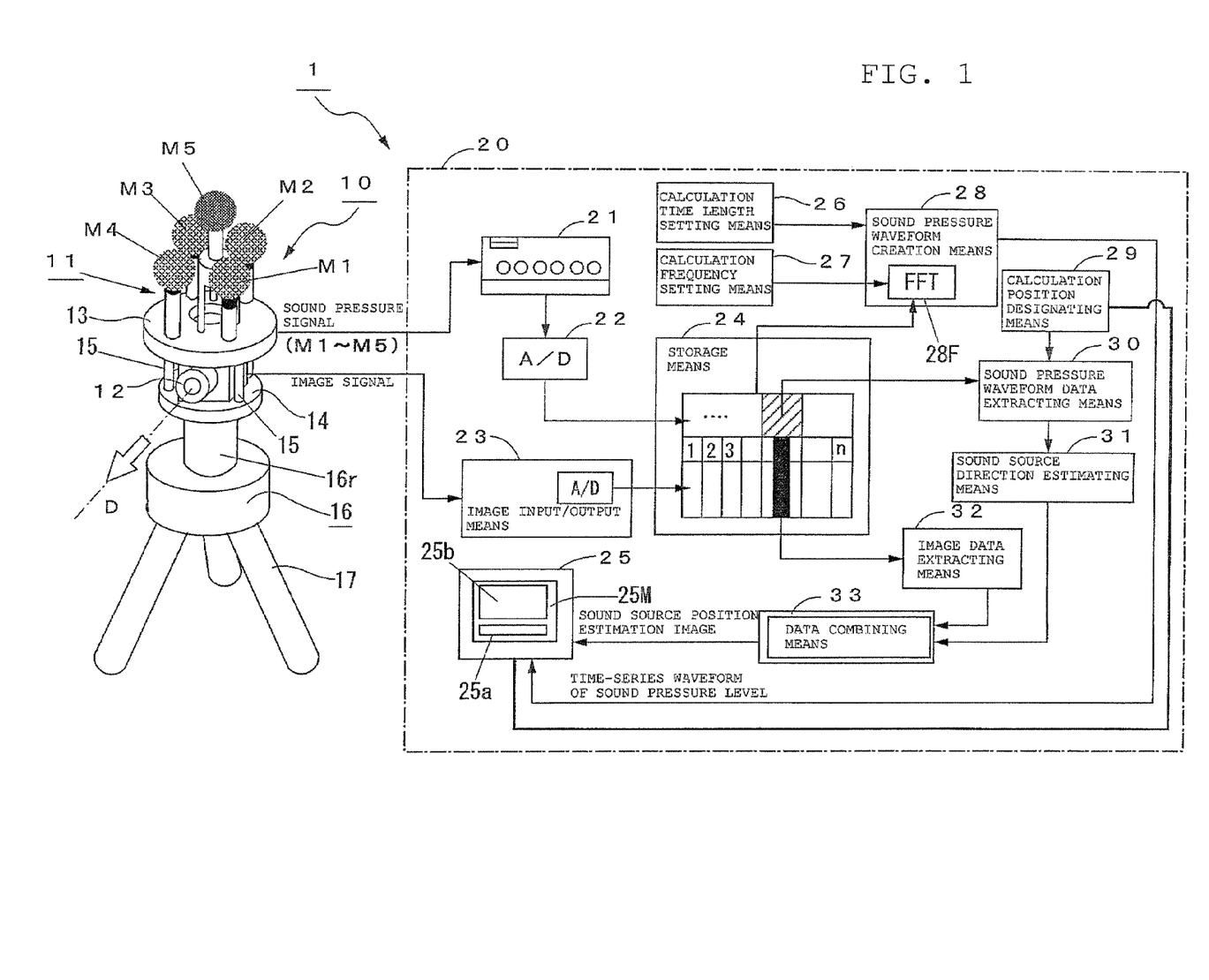
FIG. 1 is a functional block diagram showing a structure of a sound source estimation system according to the first embodiment of the invention.

FIG. 1 is a functional block diagram showing a structure of a sound source estimation system 1 according to a first embodiment of the present invention. The sound source estimation system 1 includes a sound/image sampling unit 10 and a sound source position estimating unit 20. The sound/image sampling unit 10 includes a sound sampling means 11, a CCD camera (hereinafter referred to as "camera") 12, which is an image sampling means, a microphone fixture 13, a camera support base 14, props 15, a swivel base 16, and a pedestal 17. The sound sampling means 11 includes a plurality of microphones M1 to M5.

The microphones M1 to M5 are installed on the microphone fixture 13, and the camera 12 is installed on the camera support base 14. The microphone fixture 13 and the camera support base 14 are joined to each other with three props 15. In other words, the sound sampling means 11 and the camera 12 are integrally structured together. Note also that the microphones M1 to M5 are located above the camera 12.

The pedestal 17 may be a tripod-type support member, and the swivel base 16 is disposed on top of the pedestal 17. The camera support base 14 is mounted on a swiveling member 16r of the swivel base 16. Therefore the sound sampling means 11 and the camera 12 can be rotated in one piece by rotating the swiveling member 16r.

The microphones M1 to M5 measure the sound pressure levels of sounds propagated from not-shown sound sources, respectively.

The arrangement of the microphones M1 to M5 is the same as one shown in FIG. 10. That is, four microphones M1 to M4 are arranged in two microphone pairs, namely, a microphone pair (M1, M3) in range with each other at a predetermined interval and another microphone pair (M2, M4) in range with each other at the same predetermined interval, on two straight lines bisecting at right angles, and a fifth microphone M5 is located in a position perpendicularly apart from the plane formed by the microphones M1 to M4, that is, at the vertex of a quadrangular pyramid having a square base formed by the microphones M1 to M4. This further forms four microphone pairs (M5, M1), (M5, M2), (M5, M3), and (M5, M4).

In the present embodiment, the shooting direction of the camera 12 is set in a direction that passes through the intersection of the above-mentioned two straight lines bisecting at right angles and is substantially 45 degrees from the two straight lines. Accordingly, the sound/image sampling unit 10 faces the direction that the white arrow points in FIG. 1. The camera 12 samples images in the direction that the sound/image sampling unit 10 faces.

The sound source position estimating unit 20 includes an amplifier 21, an A/D converter 22, an image input/output means 23, a storage means 24, a display means 25, a calculation time length setting means 26, a calculation frequency designating means 27, a sound pressure waveform creation means 28, a calculation position designating means 29, a sound pressure waveform data extracting means 30, a sound source direction estimating means 31, an image data extracting means 32, and a data combining means 33.

The amplifier 21, which is provided with a low-pass filter, amplifies the sound pressure signals of sounds sampled by the microphones M1 to M4 while removing the high-frequency noise components therefrom, and outputs them to the A/D converter 22. The A/D converter 22 produces sound pressure waveform data by A/D converting the sound pressure signals and outputs them to the storage means 24. The image input/output means 23 receives the input of image signals sampled continuously by the camera 12 and outputs the image data taken from the shooting direction at predetermined intervals (e.g., 1/30 second) to the storage means 24. The storage means 24 stores both the sound pressure waveform data and image data arranged in a time series. There are known methods for storing sound pressure waveform data and image data arranged in a time series. For example, the sound pressure waveform data and image data may be synchronized with each other for storage, or they may be stored with their respective time data attached thereto. Note that a file storing sound pressure waveform data is hereinafter referred to as a "sound file", and a file storing image data as a "moving image file".

The display means 25 has a display screen 25M which has a sound pressure level display section 25a for displaying a graph of sound pressure waveform data and an image display section 25b for displaying a sound source position estimating image, as will be discussed later. The graph of sound pressure waveform data is created by the sound pressure waveform creation means 28, whereas the sound source position estimating image is created by the data combining means 33.

The calculation time length setting means 26 sets a calculation time length which corresponds to the size of sound pressure waveform data to be used in calculation to estimate sound direction. The calculation frequency designating means 27 designates a frequency band for the time-series waveform of sound pressure level created by the sound pressure waveform creation means 28.

The sound pressure waveform creation means 28 extracts sound pressure waveform data from a sound file in the storage means 24 and creates data for displaying a graph of a time-series waveform of sound pressure level. When a frequency band is designated by the calculation frequency designating means 27, the sound pressure waveform creation means 28, which is provided with a frequency analysis means 28F, performs a frequency analysis on the time-series waveform of sound pressure level called up from the sound file in the storage means 24 and creates data for displaying a graph of the time-series waveform of sound pressure level in the designated frequency band.

The calculation position designating means 29 designates a temporal position at which to perform a calculation to estimate sound direction by designating a specific point on the graph displayed in the sound pressure level display section 25a of the display screen 25M. The sound pressure waveform data extracting means 30 extracts sound pressure waveform data for calculation to estimate sound direction, which is the sound pressure waveform data for a calculation time length with the designated temporal position as the center thereof, from the sound file in the storage means 24 and outputs them to the sound source direction estimating means 31. The sound source direction estimating means 31 obtains phase differences between the microphones M1 to M5 from the extracted sound pressure waveform data, estimates the direction of a sound source from the obtained phase differences, and outputs the estimation result to the data combining means 33. Note that the calculation to estimate sound direction will be discussed in detail later.

The image data extracting means 32 extracts image data at the midpoint between the starting time and the ending time of the above-mentioned calculation time from the storage means 24 and outputs them to the data combining means 33. The data combining means 33 creates a sound source position estimation image, which is an image having graphics showing sound directions therein, by combining the data on sound direction estimated by the sound source direction estimating means 31 with the image data outputted from the image data extracting means 32, and outputs it to the display means 25.

Figure 2:
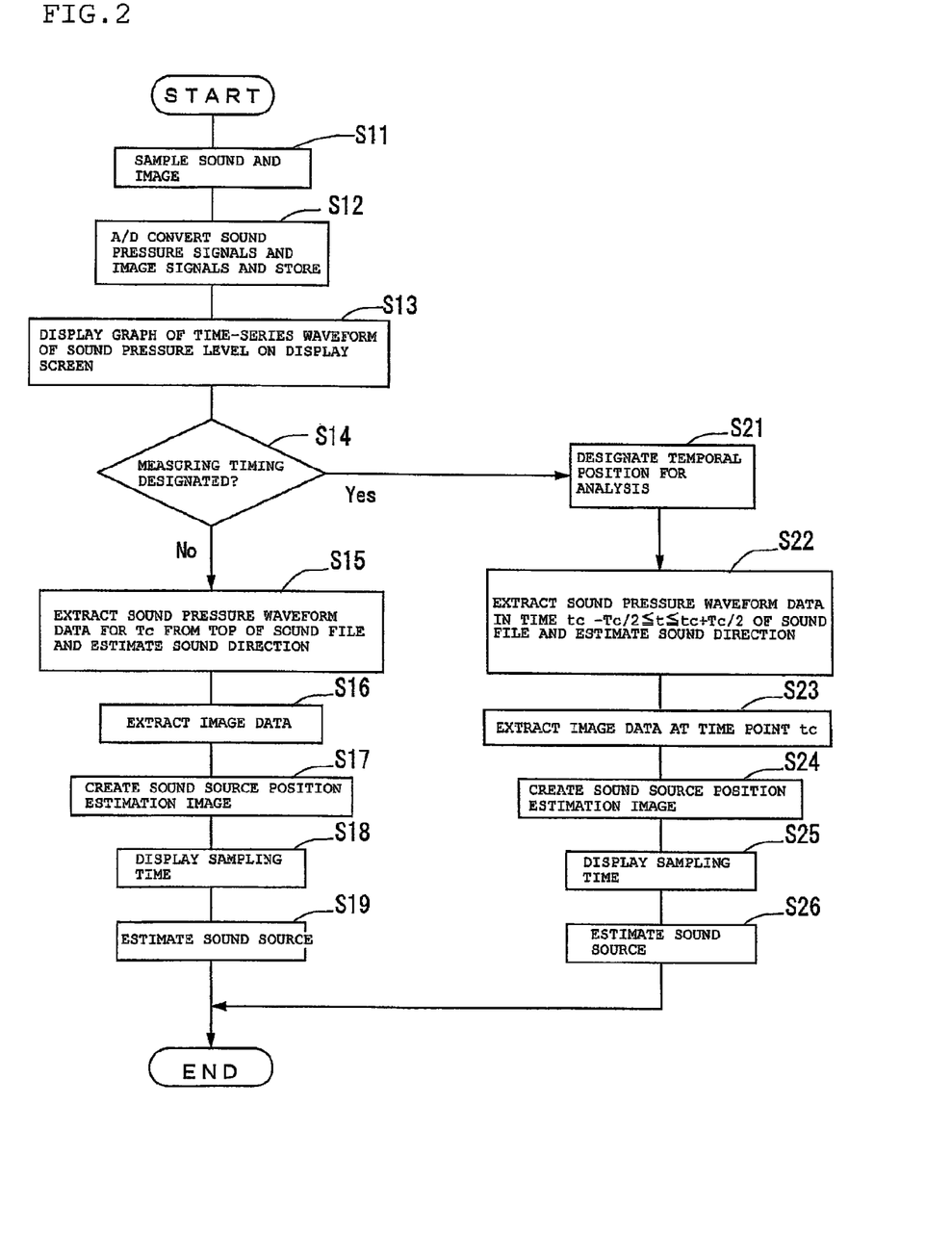
FIG. 2 is a flowchart showing a method for estimating a sound source according to the first embodiment of the invention.

Now a method for estimating the direction of a sound source using a sound source estimation system 1 will be described by referring to the flowchart of FIG. 2.

First, a sound/image sampling unit 10 and a sound source position estimating unit 20 are connected to each other, and then the sound/image sampling unit 10 is set at a measuring point. Then the camera 12 is turned toward a prospective sampling area (shooting direction), sound is sampled by microphones M1 to M5, and image of the prospective sampling area is sampled by the camera 12 (S11). At this time, sound and image are sampled by turning the swivel base 16 right and left slowly at a speed of about 3 degrees per second, for instance, with the prospective sampling area in the middle. The angle of rotation is preferably about ±60 degrees.

Next, the output signals of microphones M1 to M5 and the image signals of the camera 12 are A/D converted respectively, and then the sound pressure waveform data are stored in the sound file of the storage means 24 and the image data are stored in the moving image file (S12).

Next, a graph of a time-series waveform of the sound pressure level is created by calling up the sound pressure waveform data from the sound file, and the graph is displayed in the sound pressure level display section 25a provided on the display screen 25M of the display means 25 (S13).

Figure 3:
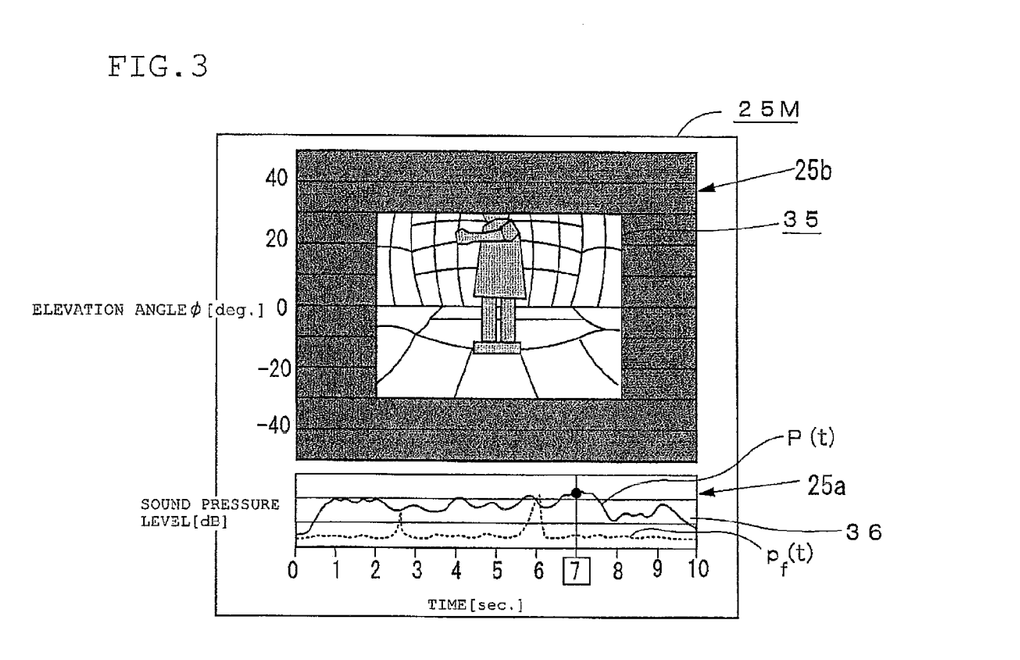
FIG. 3 shows an example of a time-series waveform of sound pressure level.

FIG. 3 illustrates an example of the display screen 25M. In the graph whose horizontal axis represents time (second) and whose vertical axis represents the sound pressure level (dB), the loudness of sampled sounds, that is, the sound pressure level of all the frequencies, changing with time is shown in a solid line P (t). The screen displaying the graph P (t) in the sound pressure level display section 25a is called the sound pressure waveform display screen 36. It should be noted here that the image display section 25b is not always required to display images. In FIG. 3, however, the image being sampled currently is displayed as moving images.

Now the measurer makes a decision as to whether the estimation of sound direction is to be performed from the beginning or by designating a measuring timing, and inputs the decision (S14). Note, however, that when the time for sampling sound and image is short, it is operationally difficult to estimate the sound direction by designating the measuring timing. Therefore, it is preferable that after sound and image are sampled, the estimation is conducted using a procedure similar to one in which the measuring timing is designated.

Where the estimation of sound direction is to be performed from the beginning, it is done by extracting sound pressure waveform data for a predetermined calculation time length $T_c$ from the beginning of the sound file (S15). In this step, a frequency analysis is carried out on the sound pressure waveform data by FFT (Fast Fourier Transform), phase differences between the microphones M1 to M5 are derived for each frequency, and sound direction is estimated from the derived phase differences for each frequency. In the present embodiment, however, it is to be noted that the horizontal angle θ and the elevation angle φ are obtained using the arrival time differences which are physical quantities proportional to phase differences.

The procedure for calculating the horizontal angle θ and the elevation angle φ in this step (S15) will be described later.

Following this, image data $G_c$ located at the midpoint time $t_m$ of a calculation time, namely, the time point $t_m=t_0+(T_c/2)$ which is a half of the calculation time length $T_c$ past the measurement start time $t_0$, is extracted from the moving image file (S16). Then the data $(\theta_f, \phi_f)$ on sound direction for each frequency calculated as mentioned above and the image data $G_c$ are combined into a sound source position estimation image (S17). Now the sound source position estimation image is displayed in the image display section 25b provided on the display screen 25M of the display means, and at the same time the sampling time of the image data $G_c$, which are the data on the sound source position estimation image, is displayed in the sound pressure level display section 25a (S18).

Figure 4:
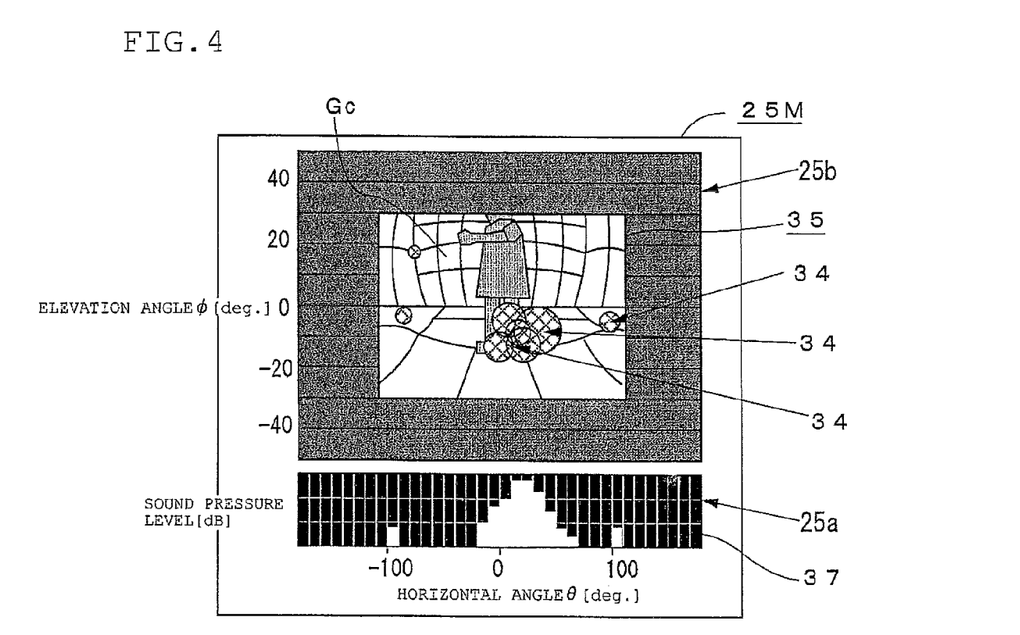
FIG. 4 shows an example of a display screen displaying a sound source position estimation image.

FIG. 4 illustrates an example of the display screen 25M. Displayed in the image display section 25b is a sound source position estimation screen 35 which has graphics (netted circles) 34 indicating sound direction rendered on the image data $G_c$. The horizontal axis of the sound source position estimation screen 35 represents the horizontal angle $\theta_f$, and the vertical axis thereof the elevation angle $\phi_f$. Also, the size of the netted circle represents the sound pressure level.

It should be understood that the estimated direction of a sound source may also be displayed for each predetermined frequency band. In such a case, the color of the netted circle 34 can be changed for each frequency band. It is also possible that instead of the graph of a time-series waveform of sound pressure level, a sound pressure level display screen 37 displaying the sound pressure level (dB) with the horizontal axis representing the horizontal angle θ may be displayed in the sound pressure level display section 25a.

Finally, a sound source (or sources) is estimated from the sound source position estimation image 35 (S19). The image present at the spot where the graphic 34 indicating sound direction is rendered is the image of the estimated sound source.

On the other hand, when the estimation of sound direction is to be performed by designating a measuring timing, the procedure goes to step S21. In step S21, a temporal position at which to carry out a calculation to estimate sound direction is designated by specifying a specific point on the graph of a time-series waveform of sound pressure level.

For example, if a computer takes over the functions of the sound source position estimating unit 20 from the storage means 24 to the data combining means 33, then the temporal position at which to perform a calculation to estimate sound direction can be designated by clicking the mouse on a desired temporal position on the graph of a time-series waveform of sound pressure level on the display screen (display means 25).

If time $t_c$ is the temporal position thus designated, the time $t_c$ will be set as the midpoint time of the calculation time. Then the sound direction is estimated by extracting the sound pressure waveform data from a time point half the calculation time length $T_c$ before the time $t_c$ to a time point half of the calculation time length $T_c$ after the time $t_c$ (S22). The estimation of sound direction is done in the same way as in step S15.

On completion of the estimation of sound direction, the image data $G_c$ sampled at the time $t_c$, which is the midpoint of the calculation time, is extracted from the moving image file (S23), and the sound direction data ($\theta_f$, $\phi_f$) calculated for each frequency and the image data $G_c$ are combined with each other (S24). Then a sound source position estimation image 35, which is the combined image, is displayed in the image display section 25b on the display screen 25M, and at the same time the sampling time of the image data $G_c$ is displayed in the sound pressure level display section 25a (S25). The sound source position estimation image 35 is as shown in FIG. 4.

Finally, a sound source (or sources) is estimated from the sound source position estimation image 35 (S26).

Also, repetition of operation from step S21 to step S26 realizes efficient and reliable estimation of sound directions at a plurality of time points. It should be noted also that when there is wide variation in sound direction as rendered on the sound source position estimation image 35 in step S26, the setting position of the sound/image sampling unit 10 should be changed and the measurement taken again.

The procedure for calculating the horizontal angle $\theta$ and the elevation angle $\phi$ in step S15 will now be described.

Let $D_{ij}$ be an arrival time difference between microphone Mi and microphone Mj of each microphone pair (Mi, Mj). Then the horizontal angle $\theta$ and the elevation angle $\phi$, which represent the incident direction of a sound, can be expressed as shown in equations (1) and (2), respectively. Thus, the horizontal angle $\theta$ and the elevation angle $\phi$ can be obtained by performing a frequency analysis on the output signals of the microphones M1 to M5 by FFT and calculating the arrival time difference $D_{ij}$ between microphones Mi and Mj for a given frequency f.

$$\theta = \tan^{-1}\left(\frac{D_{13}}{D_{24}}\right) \quad \text{[Formula 1]}$$

$$\phi = \tan^{-1}\left(\frac{D_{51} + D_{52} + D_{53} + D_{54}}{2\sqrt{3}\sqrt{D_{13}^2 + D_{24}^2}}\right) \quad \text{[Formula 2]}$$

In other words, using two microphone pairs, namely, a microphone pair (M1, M3) in range with each other at a predetermined interval and a microphone pair (M2, M4) in range with each other at the same predetermined interval on two straight lines bisecting at right angles, a horizontal angle $\theta$ formed between the measuring point and the sound source position is estimated from the ratio between the arrival time difference $D_{13}$ between the sound pressure signals entering the microphones M1 and M3 and the arrival time difference $D_{24}$ between the sound pressure signals entering the microphones M2 and M4. Also, an elevation angle $\phi$ formed between the measuring point and the sound source position is estimated from the above-mentioned arrival time differences $D_{13}$ and $D_{24}$ and the respective arrival time differences $D_{5j}$ (j=1 to 4) between the fifth microphone M5 and the other microphones M1 to M4.

Note that the arrival time difference $D_{ij}$ can be calculated using equation (Formula 3), in which a cross spectrum $P_{ij}$ (f) of signals entering the two microphone pairs ($M_i$, $M_j$) is obtained and phase angle information $\psi$ (rad) for a given frequency f is used.

$$D_{ij} = \frac{1}{2\pi f}\Psi[P_{ij}(f)] \text{ (sec)} \quad \text{[Formula 3]}$$

The estimation of sound direction is performed for every image data set from the shooting direction stored at predetermined time intervals.

Thus, according to the first embodiment of the present invention, sound and image are first sampled simultaneously using a sound/image sampling unit 10 incorporating a plurality of microphones M1 to M5 and a camera 12, and then, after they are A/D converted, the sound pressure waveform data are stored in a sound file in a storage means 24 and the image data are stored in a moving image file. At the same time, only the sound pressure waveform data are called up from the storage means 24, and a graph of a time-series waveform of the sound pressure level is displayed on a display screen 25M of a display means 25. Time $t_c$ at which to carry out a calculation to estimate sound direction is designated on the graph, and then sound direction is estimated by calculating the phase differences between the sound pressure signals of the sound sampled by the plurality of microphones M1 to M5, using the sound pressure waveform data for a calculation time length $T_c$ having the designated time point $t_c$ at the center thereof. And a sound source position estimation image having graphics showing estimated sound directions is created by combining the estimated sound directions and the image data $G_c$ sampled at time $t_c$, and thus the sound sources are estimated.

Therefore this method can greatly shorten the time for estimating a sound source position.

Also, when there is some doubt about the validity of measurement taken, for example, due to an inappropriate position of the measuring point, this method facilitates a quick decision for remedy, thus enabling efficient estimation of the sound source position.

In this embodiment, the direction of a sound source may be estimated by designating a measuring timing while sound and image are being sampled. However, it can also be done by designating the measuring timing after sound and image are sampled. According to this invention, therefore, the method of estimating sound direction by designating the measuring timing allows creation of a sound source position estimation image by extracting data in optional timing. Hence, the number of sound source position estimation images to be created can be much fewer than with the conventional methods. Accordingly, the time required in estimating a sound source position can be greatly shortened. Moreover, with this method, it is not only possible to grasp the change in sound source positions but also to verify the history of the propagated sounds on the spot.

Also, in this embodiment, the graph P(t) of a time-series waveform of sound pressure level represents the loudness of the sampled sounds. However, it may be switched to a graph of sound pressure level for a predetermined frequency band. More specifically, a frequency band for the sound pressure waveform to be created by the sound pressure waveform creation means 28 is designated by the calculation frequency designating means 27, then a frequency analysis is performed on the sound pressure waveform data called up from the sound file in the storage means 24, using the frequency analysis means 28F provided in the sound pressure waveform creation means 28, and data are prepared for the display of a graph of a time-series waveform of sound pressure level for the designated frequency band.

As exemplified by the graph $p_f(t)$ in a broken line in FIG. 3, a graph of a sound pressure waveform for a frequency band having a designated band width with frequency f at the center thereof tends to have sharp peaks in contrast to the graph of a sound pressure waveform for all the frequencies. Therefore, by the use of a graph of a sound pressure waveform for a limited frequency band, it is possible to accurately estimate sound source positions of sounds propagated from specific equipment, such as the noise from a transformer in a power supply box or the vibration noise of an air conditioner.

Also, when the estimation of sound sources is to be carried out inside a vehicle in which there is no need to analyze the outside noises of low frequencies, it is preferable that the sources of middle-range sounds only are estimated using a graph of a sound pressure waveform for a limited frequency band.

Also, in the foregoing embodiment, sound and image are sampled while the sound/image sampling unit 10 is being rotated (swiveled). However, where it is expected that the sound occurs intermittently or the presence of sound sources changes with time, the measurement should preferably be taken with the sound/image sampling unit 10 fixed.

Furthermore, in this embodiment, the horizontal angle $\theta$ and elevation angle $\phi$ formed between the measuring point and the sound source position are estimated using five microphones M1 to M5. Yet, in the cases where the sound source position can be estimated by the horizontal angle $\theta$ alone, then the microphone M5 can be omitted, and only the two microphone pairs, namely, the microphone pair (M1, M3) in range with each other at a predetermined interval and the microphone pair (M2, M4) in range with each other at the same predetermined interval on two straight lines bisecting at right angles may be used.

Second Embodiment

A second embodiment of the present invention provides a reinforcement of the first embodiment in better coping with situations where sudden sounds or intermittent sounds are expected.

Figure 5:
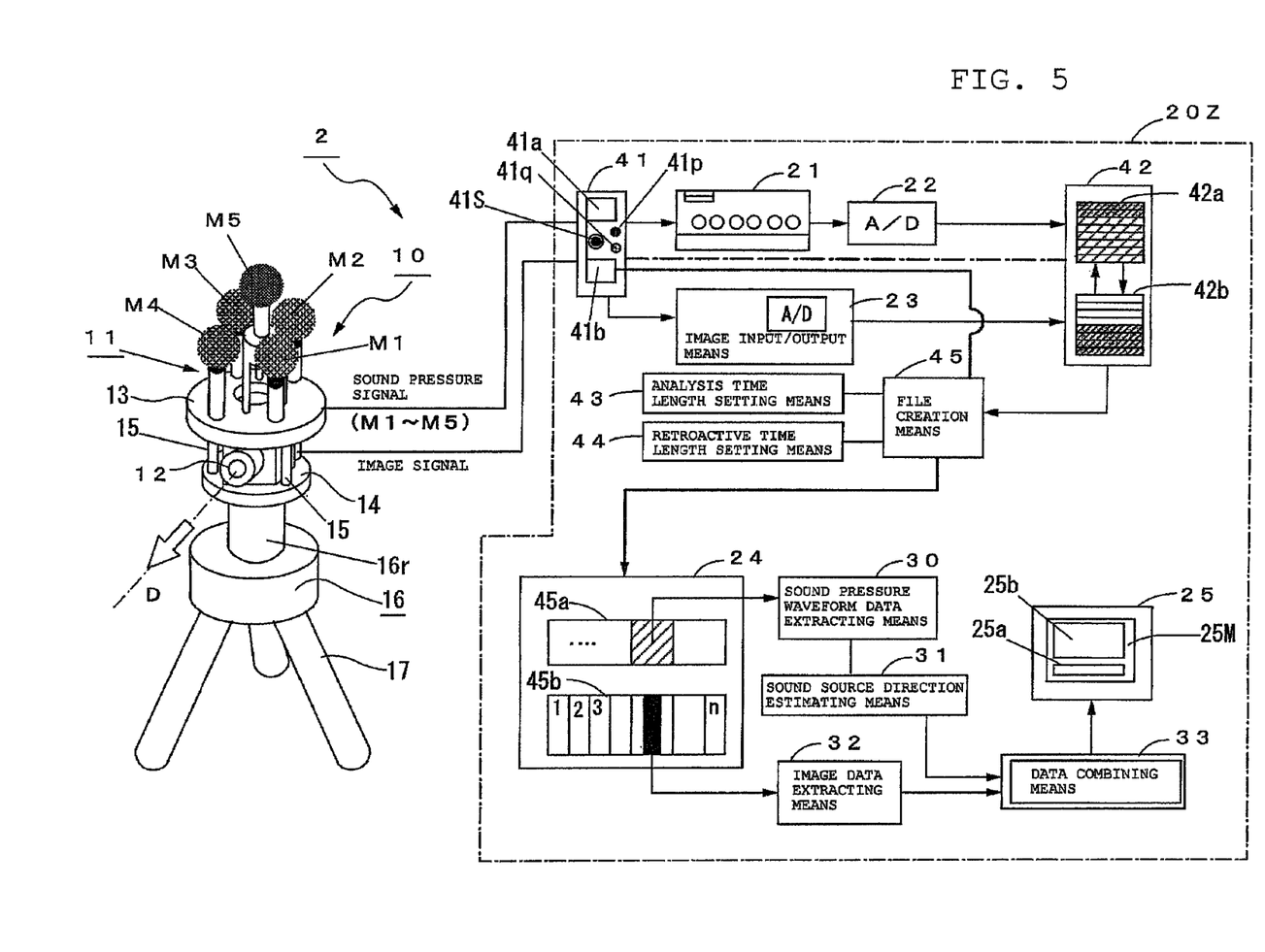
FIG. 5 is a functional block diagram showing a structure of a sound source estimation system according to the second embodiment of the invention.

As shown in FIG. 5, a sound source estimation system 2 according to the second embodiment is provided with a means of temporarily storing sound pressure signals, which are A/D converted by an A/D converter 22, and image signals, which are A/D converted by an image input/output means 23, as sound waveform data and image data, respectively, and a means of outputting a command signal to start the estimation of sound direction (measurement start signal output unit 41a of mode switching means 41). And the system extracts sound pressure waveform data and image data from a time point a predetermined retroactive time length before the issue of a command to start a sound direction measurement to a time point a predetermined analysis time length thereafter, when such a command is issued, and estimates sound sources using those data. Therefore, this system assures estimation of sound sources with greater reliability even when there are sudden or intermittent sounds in the environment.

FIG. 5 is a functional block diagram showing a structure of the sound source estimation system 2. The sound source estimation system 2 includes a sound/image sampling unit 10 and a sound source position estimating unit 20Z.

The structure and operation of the sound/image sampling unit 10 are the same as those of the first embodiment, and the description thereof is omitted.

The sound source position estimating unit 20Z includes a mode switching means 41, an amplifier 21, an A/D converter 22, an image input/output means 23, a buffer 42, which is a temporary storage means, a storage means 24, an analysis time length setting means 43, a retroactive time length setting means 44, a file creation means 45, a display means 25, a sound pressure waveform data extracting means 30, a sound direction estimating means 31, an image data extracting means 32, and a data combining means 33.

The sound source estimation system 2 of this embodiment has two measurement modes, namely, normal mode and retroactive mode.

In the normal mode, sound source estimation is performed using data for a predetermined analysis time length from the time point when a measurement start signal, which is a command signal to start the estimation of sound direction, is inputted. In the retroactive mode, sound source estimation is performed using data from a time point a predetermined time length before the input of the measurement start signal.

The mode switching means 41 includes a mode switching part 41a, a measurement start signal output part 41b, a measurement permission display part 41p, a retroactive mode usable display part 41q, and a measurement start switch 41S. The mode switching part 41a switches the measurement mode between the normal mode and the retroactive mode, and also specifies a method for data extracting from the storage means 24 to the file creation means 45. The measurement start signal output part 41b outputs a measurement start signal when the measurement start switch 41S is turned on. The measurement permission display part 41p, with its LED lighting up for instance, has the measurer visually confirm that the amount of data that permits measurement has been stored in the buffer 42. The retroactive mode usable display part 41q, with its LED lighting up for instance, has the measurer visually confirm that the amount of data that permits measurement in the retroactive mode has been stored in the buffer 42. Note that in the retroactive mode, the measurement start signal is not outputted without the LED of the retroactive mode usable display part 41q lighting up.

The amplifier 21, which is provided with a low-pass filter, amplifies the sound pressure signals of sounds sampled by the microphones M1 to M4 while removing the high-frequency noise components therefrom, and outputs them to the A/D converter 22. The A/D converter 22 produces sound pressure waveform data by A/D converting the sound pressure signals and outputs them to the buffer 42. The image input/output means 23 receives the input of image signals sampled continuously by the camera 12 and outputs the image data from the shooting direction at predetermined intervals (e.g., 1/30 second) to the buffer 42.

The buffer 42 temporarily stores the sound pressure waveform data and the image data for a predetermined period of time. The buffer 42 has a first buffer 42a and a second buffer 42b. When the first buffer 42a becomes full, new sound pressure waveform data and image data are stored in the second buffer 42b. And when the second buffer 42b becomes full, all the data stored in first buffer 42a are deleted and new sound pressure waveform data and image data are stored in the first buffer 42a.

In storing the sound pressure waveform data and image data in the first buffer 42a or the second buffer 42b, a known method of synchronizing them with each other or attaching their respective time data thereto may be used.

The analysis time length setting means 43 sets an analysis time length $T_w$ which is a time length for the estimation of a sound source by analyzing the sound pressure waveform data and image data. The retroactive time length setting means 44 sets a retroactive time length $T_z$ from a first time point $t_1$ which is the time when a measurement start signal is issued for a sound source estimation. The file creation means 45 extracts the sound pressure waveform data and image data stored in the buffer 42 during a period from time $t_2=t_1-T_z$, which is a second time point, to time $t_3=t_1+(T_w-T_z)$, which is a third time point, from the buffer 42, creates a sound file 45a from the sound pressure waveform data and a moving image file 45b from the image data, and stores these files 45a and 45b in the storage means 24.

The storage means 24 stores the sound file 45a and the moving image file 45b created by the file creation means 45. The storage means 24, which is constituted by RAM, is rewritable. The display means 25 has a display screen 25M which has an image display section 25b for displaying a sound source position estimation image and a sound pressure level display section 25a for showing a relationship between the horizontal angle θ of sound direction and sound pressure level, as will be described later.

The sound pressure waveform data extracting means 30 extracts sound pressure waveform data for calculation to estimate sound direction, which is the sound pressure waveform data for a predetermined analysis time length, from the sound file 45a stored in the storage means 24 and outputs them to the sound direction estimating means 31. The sound direction estimating means 31 obtains phase differences between the microphones M1 to M5 from the extracted sound pressure waveform data, estimates sound direction from the obtained phase differences, and outputs the estimation results to the data combining means 33. It should be noted that the details of estimation of sound direction are the same as those of the first embodiment.

The image data extracting means 32 extracts image data at the midpoint between the starting time and the ending time of the above-mentioned analysis time from the moving image file 45b stored in the storage means 24 and outputs them to the data combining means 33. The data combining means 33 creates a sound source position estimation image having graphics showing sound directions therein by combining the data on sound directions estimated by the sound direction estimating means 31 with the image data outputted from the image data extracting means 32 and outputs it to the display means 25.

Figure 6:
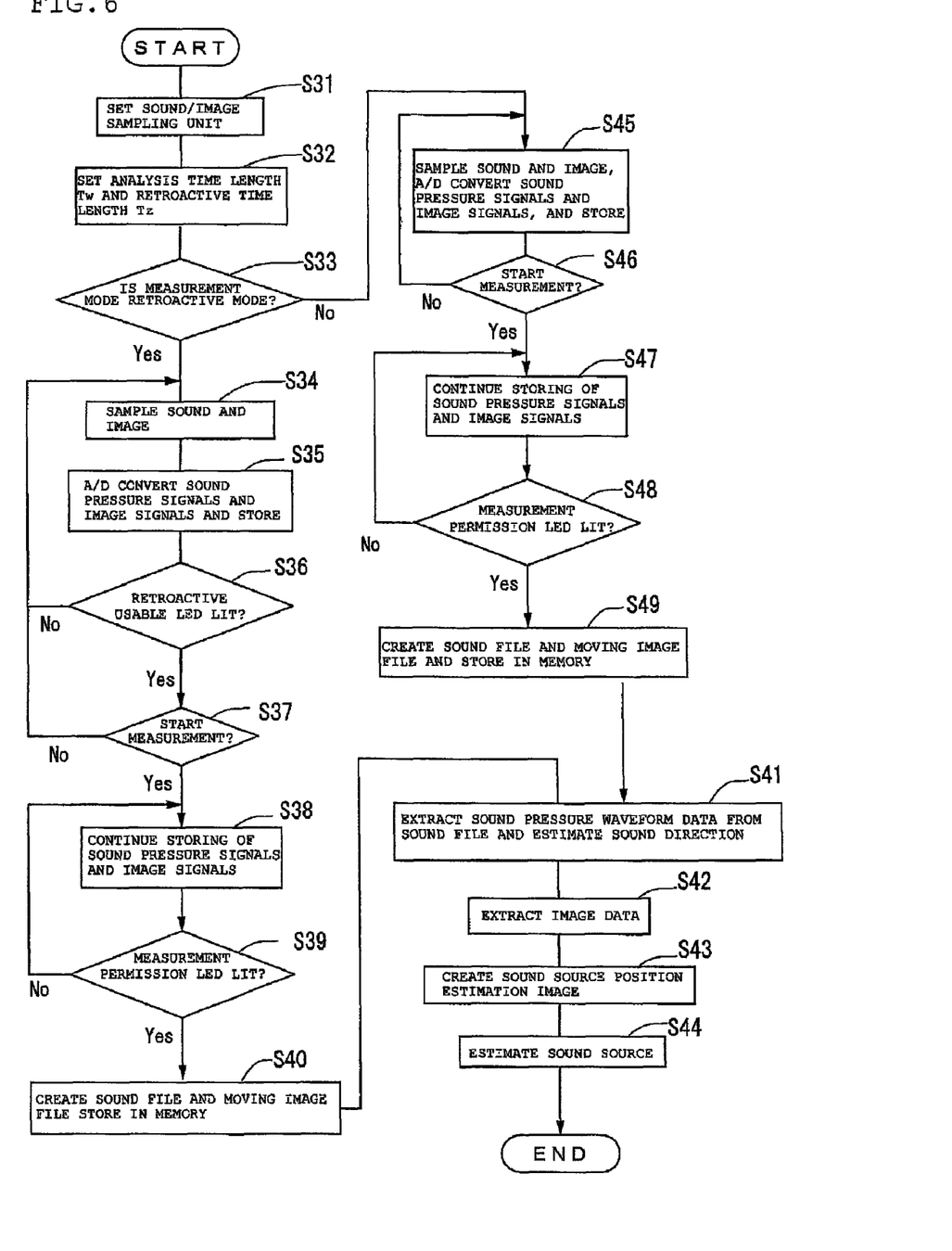
FIG. 6 is a flowchart showing a method for estimating a sound source according to the second embodiment of the invention.

Now a method for estimating the direction of a sound source using a sound source estimation system 2 will be described by referring to the flowchart of FIG. 6.

First, a sound/image sampling unit 10 and a sound source position estimating unit 20Z are connected to each other, and then the sound/image sampling unit 10 is set at a measuring point (S31). Next, an analysis time length $T_w$ and a retroactive time length $T_z$ are set (S32), and a measurement mode is selected (S33).

The procedure when the retroactive mode is selected in step S33 is first explained.

After the selection of the measurement mode, the camera 12 is turned toward a prospective sampling area (shooting direction), sound is sampled by the microphones M1 to M5, and image of the prospective sampling area is sampled by the camera 12 (S34).

In the present example, the prospective sampling area used is a fountain which produces sounds intermittently, and therefore the measurement is taken with the sound/image sampling unit 10 fixed. It is to be noted that when the measurement is taken near the fountain, the whole fountain may not enter the image field. In such a case, sound and image may be sampled by turning the swivel base 16 right and left slowly at a speed of about 3 degrees per second, for instance, with the center of the fountain in the middle. The angle of rotation is preferably about ±60 degrees.

Then the output signals of the microphones M1 to M5 and the image signals of the camera 12 are A/D converted respectively, and the sound pressure waveform data and image data (hereinafter referred to as "data") are stored in the buffer 42 (S35).

With the data for the retroactive time length $T_z$ stored in the buffer 42, the LED of the retroactive mode usable display part 41q will light up. Seeing the LED, the measurer decides on whether the measurement in the retroactive mode is possible or not (S36).

When the LED of the retroactive mode usable display part 41q is not lit, there are not enough data for the retroactive time length $T_z$ stored in the buffer 42. Therefore the measurement in the retroactive mode cannot be performed, so that storage of data is continued until the LED of the retroactive mode usable display part 41q lights up. When the LED of the retroactive mode usable display part 41q is lit, the measurement can be performed in the retroactive mode, so that the measurement start signal can be outputted at any time.

Next, a decision is made as to whether a measurement start signal is outputted or not (S37). When the measurement start signal is not outputted, storage of data is continued. Even after the measurement start signal is outputted, the operation of storing the output signals of the microphones M1 to M5 and the image signals of the camera 12 as sound pressure waveform data and image data respectively in the buffer 42 is continued (38).

Then, by seeing whether the LED of the measurement permission display part 41p is lit or not, a decision is made as to whether there are enough data for the analysis time length $T_w$ stored in the buffer 42 or not (S39). When there are not enough data for the analysis time length $T_w$ in the buffer 42, storage of data is continued. When enough data for the analysis time length $T_w$ are stored in the buffer 42, the LED of the measurement permission display part 41p will light up. Then the data are extracted from the buffer 42, a sound file 45a and a moving image file 45b are created by the file creation means 45, and these files 45a and 45b are stored in the storage means 24 (S40).

Figure 7:
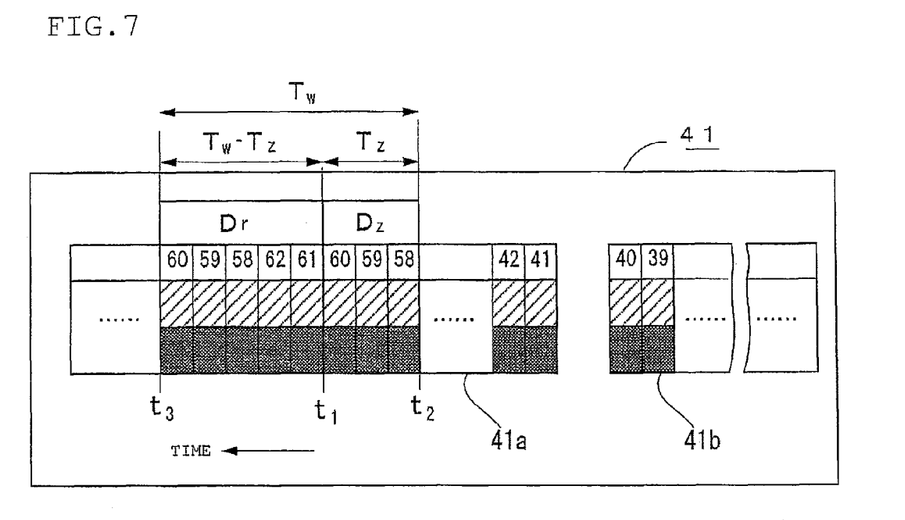
FIG. 7 is a diagram for explaining a method for extracting data in the retroactive mode.

In step S40, as shown in FIG. 7, the data extracted from the buffer 42 are constituted by retroactive data $D_z$, which are data stored in the buffer 42 during a period from a second time point $t_2=t_1-T_z$ to a first time point $t_1$, which is a measurement start time, and remaining measurement data $D_r$, which are data stored in the buffer 42 during a period from the first time point $t_1$ to a third time point $t_3=t_1+(T_w-T_z)$. That is, the waiting time from the output of a measurement start signal to the completion of storage of enough data for the analysis time length $T_w$ is ($T_w-T_z$).

Next, a sound direction is estimated by extracting sound pressure waveform data for a predetermined calculation time length $T_c$ from the sound file 45*a* (S41). In the same way as in the first embodiment, a frequency analysis is performed on the sound pressure waveform data by FFT, phase differences between the microphones M1 to M5 are derived for each frequency, and the sound direction is estimated from the derived phase differences for each frequency.

Then image data $G_c$ located at the midpoint time $t_m$ of calculation time, namely, the time $t_m=t_c+(T_c/2)$ which is half the calculation time length $T_c$ past the measurement start time $t_c$, is extracted from the moving image file (S42). Then the data ($\theta_f, \phi_f$) of sound direction for each frequency calculated as mentioned above and the image data $G_c$ are combined into a sound source position estimation image, and the sound source position estimation image is displayed as a sound source position estimation screen in the image display section 25*b* provided on the display screen 25M of the display means (S43).

Figure 8:
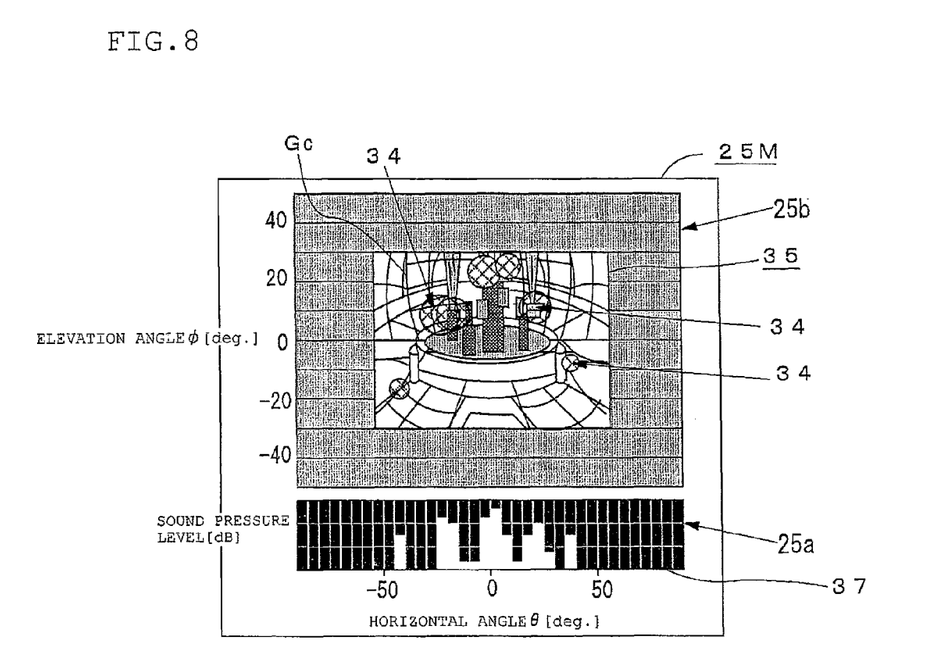
FIG. 8 shows an example of a display screen displaying a sound source position estimation image.

FIG. 8 illustrates an example of the display screen 25M. Displayed in the image display section 25*b* is a sound source position estimation screen 35 which has graphics (netted circles) 34 indicating sound directions rendered on the image data $G_c$. The horizontal axis of the sound source position estimation screen 35 represents the horizontal angle $\theta_f$, and the vertical axis thereof the elevation angle $(1)_f$. Also, the size of the netted circle represents the sound pressure level.

It is to be noted that the estimated directions of sound sources may also be displayed for each predetermined frequency band. In such a case, the color of the netted circle 34 can be changed for each frequency band.

Also, displayed in the sound pressure level display section 25*a* is a sound pressure level display screen 37 to display the sound pressure level (dB) with the horizontal axis representing the horizontal angle $\theta$ (deg.).

Finally, sound sources are estimated from the sound source position estimation screen 35 (S44). On the sound source position estimation screen 35, the images present at the spots where the graphics 34 indicating sound directions are rendered are the images of the estimated sound sources.

When the normal mode is selected in step S33, the procedure goes to step S45.

In step S45, the camera 12 is turned toward a prospective sampling area (shooting direction), sound is sampled by the microphones M1 to M5, and image of the prospective sampling area is sampled by the camera 12. At the same time, the output signals of the microphones M1 to M5 and the image signals of the camera 12 are A/D converted respectively, and the sound pressure waveform data and image data are stored in the buffer 42.

Next, a decision is made as to whether a measurement start signal is outputted or not (S46). When the measurement start signal is not outputted, storage of data is continued. Even after the measurement start signal is outputted, the operation of storing the output signals of the microphones M1 to M5 and the image signals of the camera 12 as sound pressure waveform data and image data respectively in the buffer 42 is continued (47).

Then, by seeing whether the LED of the measurement permission display part 41*p* is lit or not, a decision is made as to whether there is enough data for the analysis time length $T_w$ stored in the buffer 42 or not (S48). When there are not enough data for the analysis time length $T_w$ in the buffer 42, storage of data is continued. When enough data for the analysis time length $T_w$ are stored in the buffer 42, the LED of the measurement permission display part 41*p* will light up. Then the data are extracted from the buffer 42, a sound file 45*a* and a moving image file 45*b* are created by the file creation means 45, and these files 45*a* and 45*b* are stored in the storage means 24 (S49).

In step S49, the data extracted from the buffer 42 are the data stored in the buffer 42 during a period from a first time point $t_1$, which is a measurement start time, to a time point $t_w=t_1+T_w$, which is an analysis time length $T_w$ later.

The procedural steps for estimation of sound direction, extraction of image data, creation and display of a sound source position estimation screen, and estimation of a sound source are the same for both the normal mode and the retroactive mode. Therefore, after the sound file 45*a* and the moving image file 45*b* are stored in the storage means 24, the procedure goes to step S41, and a sound source is estimated by performing steps S41 through S44.

Thus, according to the second embodiment of the present invention, sound and image are first sampled simultaneously using a sound/image sampling unit 10 incorporating a plurality of microphones M1 to M5 and a camera 12, and then, after they are A/D converted, they are temporarily stored in a buffer 42. And when a command for a measurement start signal is issued from a measurement start signal output part 41*a* of a mode switching means 41, the sound pressure waveform data and image data stored in the buffer 42 during a period from time $t_2=t_1-T_z$, which is a second time point a predetermined retroactive time length $T_z$ before a first time point $t_1$ when the command is issued, to time $t_3=t_1+(T_w-T_z)$, which is a third time point, are extracted, a sound file 45*a* is created from the sound pressure waveform data and a moving image file 45*b* from the image data, and these files 45*a* and 45*b* are stored in a storage means 24. Then, using the sound pressure waveform data of the stored sound file 45*a*, the phase differences between the sound pressure signals sampled by the microphones M1 to M5 are calculated, and the horizontal angle $\theta$ and the elevation angle $\phi$, which indicate the direction of a sound source, are estimated. Therefore even when sudden sounds or intermittent sounds occur, the directions of sources of such sounds can be estimated with high reliability. Accordingly, there will be fewer chances of failed measurement.

Also, in this embodiment, a sound source is estimated by displaying a sound source position estimation screen 35 having graphics showing estimated sound directions by combining the estimated sound direction ($\theta, \phi$) and the image data $G_c$ sampled during the calculation time length $T_c$. Therefore, the sound source can be estimated with excellent reliability.

In the second embodiment of the present invention, the direction of a sound source is estimated from the beginning of a sound file. However, the arrangement may also be such that sound pressure waveform data are called up from the sound file, a graph of a time-series waveform of sound pressure level is created, and a temporal position of sound pressure waveform data for a calculation time length Tc to be extracted from the sound file is designated using the graph.

Figure 9:
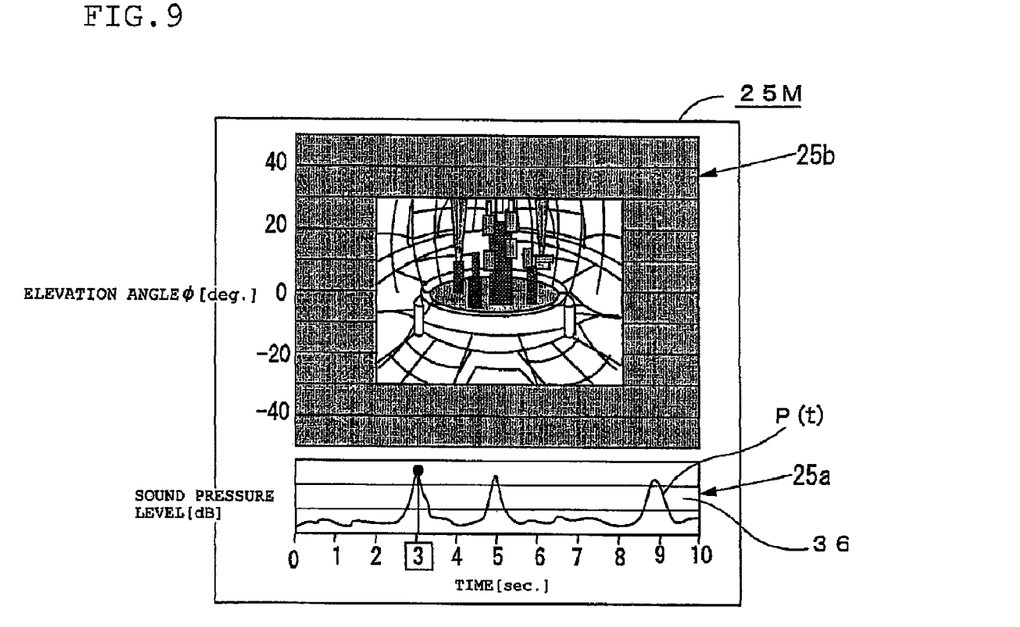
FIG. 9 shows an example of a display screen displaying a graph of a time-series waveform of sound pressure level.

FIG. 9 shows an example of a graph of a time-series waveform of sound pressure level. When a graph of a time-series waveform of sound pressure level is to be displayed on the display screen 25M, it is displayed in the sound pressure level display section 25*a* where a sound pressure level display screen 37 is displayed. In the graph, the horizontal axis represents time (second) and the vertical axis represents the sound pressure level (dB). The temporal position for an analysis to determine sound direction can be set by designating a specific point (a peak at 3 seconds from the start of measurement in this example) on the graph of a time-series waveform of sound pressure level displayed on the sound pressure waveform display screen 36.

Also, the graph of a time-series waveform of sound pressure level may be a graph P (t) showing the loudness of the sampled sounds, namely, the sound pressure level of all the frequencies, changing with time. It may also be a graph of sound pressure level for a predetermined frequency band changing with time.

With a fountain as shown in FIG. 9, the sound pressure level rises whenever the water is shot up. Therefore, by designating a peak on the graph, it is possible to estimate where on the fountain the peak sounds are arising.

Also, in the second embodiment, the horizontal angle $\theta$ and elevation angle $\phi$ formed between the measuring point and the sound source position are estimated using five microphones M1 to M5. Yet, in the cases where the sound source position can be estimated by the horizontal angle $\theta$ alone, then the microphone M5 can be omitted, and only the two microphone pairs, namely, the microphone pair (M1, M3) in range with each other at a predetermined interval and the microphone pair (M2, M4) in range with each other at the same predetermined interval on two straight lines bisecting at right angles may be used.

As described hereinabove, according to the present invention, sound source positions can be estimated by extracting an optional part of measured data on the spot. Therefore, the time required in estimating sound source positions can be greatly shortened, and the estimation of sound sources can be performed very efficiently.

Also, when there is some doubt about the validity of measurement taken, for example, due to an inappropriate position of the measuring point, this method facilitates a quick decision on remedy, thus enabling efficient estimation of sound source positions.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

The present application is based on Japanese Priority Application No. 2009-46835 and 2009-48554 filed on Feb. 27, 2009 and Mar. 2, 2009 with the Japanese Patent Office, the entire contents of which are hereby incorporated by reference.

What is claimed is:

1. A method for estimating a location of a sound source, comprising the steps of:
    (a) sampling sound information and image information simultaneously using a sound/image sampling unit incorporating a group of microphones in pairs of microphones arranged at a predetermined interval on straight lines bisecting at right angles and an image pickup device configured to sample images in the direction of the sound source;
    (b) storing sound pressure waveform data which is sound pressure signals of the sampled sound and image data which is the sampled image information respectively in a storage device;
    (c) extracting the sound pressure waveform data from the storage device and displaying a graph of a time-series waveform of sound pressure level;
    (d) designating a temporal position on the graph at which to perform calculation to estimate the direction of a sound source;
    (e) estimating the direction of a sound source by calculating the arrival time differences between the sound pressure signals of the sound sampled by the pairs of microphones, using sound pressure waveform data for a predetermined calculation time length having the designated temporal position therein;
    (f) creating a sound source position estimation image having a graphic showing the estimated direction of a sound source by combining the estimated direction of a sound source with the image data sampled during the calculation time; and
    (g) estimating the location of a sound source using the sound source position estimation image.

2. The method for estimating a location of a sound source according to claim 1, wherein in step (b), the sound pressure signals of the sampled sound are A/D converted and stored as sound pressure waveform data in the storage device, and the image signals are A/D converted and stored as image data in the storage device;
    in step (c), a graph of a time-series waveform of sound pressure level is displayed on a display screen of a display device;
    in step (d), the temporal position at which to perform calculation to estimate the direction of a sound source is designated by specifying a specific point on the graph on the display screen;
    in step (e), the sound pressure waveform data for a predetermined calculation time length having the designated temporal position therein are extracted from the storage device; and
    step (f) further comprises the steps of:
        extracting the image data at a point of time between the starting time and the ending time of the calculation time from the storage device, and
        creating and displaying a sound source position estimation image by combining the sound direction data estimated in step (e) with the extracted image data.

3. The method for estimating a location of a sound source according to claim 2, wherein
    in step (c), the time-series waveform of sound pressure level to be extracted from the storage device is a time-series waveform of the loudness of sampled sound.

4. The method for estimating a location of a sound source according to claim 2, wherein
    step (c) further comprises the steps of:
        designating a frequency band of sound pressure signals (to be used in sound source estimation);
        obtaining a time-series waveform of sound pressure level in the designated frequency band by performing a frequency analysis on the time-series waveform of sound pressure level extracted from the storage device; and
    displaying a graph of the obtained time-series waveform of sound pressure level in the designated frequency band on the display screen of the display device.

5. The method for estimating a location of a sound source according to claim 1, further comprising the steps of:
    (h) storing the sound pressure waveform data on the sound pressure signals of the sampled sound and the image data on the sampled image respectively in a temporary storage device;
    (i) extracting sound pressure waveform data and image data stored in the temporary storage device during a period from a time point a predetermined retroactive time length before the issue of a command to start a measurement to a time point a predetermined analysis time length thereafter when such a command is issued;

(j) storing those data as a sound file and a moving image file respectively in the storage device;

(k) estimating the direction of a sound source by calculating the arrival time differences between the sound pressure signals of the sound sampled by the pairs of microphones, using the sound pressure waveform data of the stored sound file; and (l) creating a sound source position estimation image having a graphic showing the estimated direction of a sound source by combining the estimated direction of a sound source with the image data sampled during the time used in estimating the direction of a sound source and stored in the moving image file.

6. The method for estimating a location of a sound source according to claim 5, wherein in step (j), sound pressure waveform data and image data for an analysis time length to be used in estimating a sound source are extracted from the temporary storage device, and the extracted sound pressure waveform data and image data are stored as a sound file and a moving image file respectively in the storage device;

in step (k), sound pressure waveform data for a calculation time length to be used in the calculation to estimate the direction of a sound source is extracted from the sound file, and the direction of a sound source is estimated by calculating the arrival time differences of the sound pressure signals of the sound sampled by the pairs of microphones; and in step (j), the sound pressure waveform data and image data for the analysis time length extracted from the temporary storage device are the sum of the sound pressure waveform data and image data stored in the temporary storage device during a period from a second time point, which is a predetermined retroactive time length before a first time point, when a command to start the measurement is issued, to the first time point and the sound pressure waveform data and image data stored in the temporary storage device during a period from the first time point to a third time point, which is the analysis time length minus the retroactive time length past the first time point.

7. The method for estimating a location of a sound source according to claim 6, wherein between step (j) and step (k) there are further steps of:

(m) creating a graph of a time-series waveform of sound pressure waveform from the data on sound pressure waveform stored in the sound file and displaying it; and (n) designating an optional time point on the displayed graph, wherein, in step (k), the sound pressure waveform data for the calculation time length from the designated time point are extracted from the sound file.

8. An apparatus for estimating a location of a sound source comprising:

a sound/image sampling unit which includes:
a group of microphones in two pairs of microphones, the microphones arranged at a predetermined interval on two straight lines bisecting at right angles, for sampling a sound from a sound source, and
an image pickup device configured to sample images in the direction of the sound source simultaneously with sampling the sound; and a sound source position estimating unit which includes:
an A/D converter for A/D converting sound pressure signals sampled by the microphones and image signals sampled by the image pickup device into their respective digital signals;

a storage device configured to store sound pressure waveform data arranged in a time series of the A/D converted sound pressure signals as a sound file and moving image data arranged in a time series of the A/D converted image signals as a moving image file;

a sound pressure waveform creation device configured to extract sound pressure waveform data for a predetermined calculation time length from the sound file and creating a graph of a time-series waveform of sound pressure level;

a calculation position designating device configured to designate a temporal position at which to perform calculation to estimate sound direction by designating a specific point on the graph of the time-series waveform;

a sound source direction estimating device configured to extract sound pressure waveform data for the predetermined calculation time length including the designated temporal position therein, obtaining arrival time differences between the respective microphones constituting the two microphone pairs by performing a frequency analysis on the extracted sound pressure waveform data, and estimating the direction of a sound source from the ratio between the obtained phase differences of the two microphone pairs;

an image data extracting device configured to extract image data at a time point between the starting time and the ending time of the calculation time from the moving image file;

a sound source position estimation image creation device configured to create a sound source position estimation image having a graphic showing the estimated direction of a sound source by combining the data on the estimated direction of a sound source with the extracted image data; and a display device configured to display a graph of a sound pressure waveform created by the sound pressure waveform creation device and the sound source position estimation image created by the sound source position estimation image creation device.

9. The apparatus for estimating a location of a sound source according to claim 8, wherein the sound source position estimating unit further includes:

a temporary storage device configured to temporarily store the A/D converted sound pressure signals as sound pressure waveform data and the A/D converted image signals as image data for a predetermined period of time;

a command signal output device configured to output a command signal to start the estimation of a sound source direction; and an analysis file creation device configured to create a sound file and a moving image file by extracting sound pressure waveform data and image data for a predetermined analysis time length from the temporary storage device, wherein the analysis file creation device creates the sound file and the moving image file by extracting the sound pressure waveform data and image data stored in the temporary storage device during a period from a second time point, which is a predetermined retroactive time length before a first time point, when a command to start the measurement is issued, to the first time point and the sound pressure waveform data and image data stored in the temporary storage device during a period from the first time point to a third time point, which is the analysis time length minus the retroactive time length past the first time point, when the command signal is inputted, and wherein the storage device stores the sound file and the moving image file created by the analysis file creation device.

10. The apparatus for estimating a location of a sound source according to claim 8, wherein a fifth microphone is added in a position perpendicularly apart from the plane formed by the two microphone pairs of the group of microphones and wherein the sound source direction estimating device estimates the direction of a sound source, using phase differences between the microphones constituting four sets microphone pairs which are formed by the fifth microphone and the two pairs of microphones.

11. The apparatus for estimating a location of a sound source according to claim 9, wherein a fifth microphone is added in a position perpendicularly apart from the plane formed by the two microphone pairs of the group of microphones and wherein the sound source direction estimating device estimates the direction of a sound source, using phase differences between the microphones constituting four sets microphone pairs which are formed by the fifth microphone and the two pairs of microphones.

* * * * *